(12) United States Patent
Vronay et al.

(10) Patent No.: US 7,904,826 B2
(45) Date of Patent: Mar. 8, 2011

(54) PEEK AROUND USER INTERFACE

(75) Inventors: David P. Vronay, Bellevue, WA (US); Lili Cheng, Bellevue, WA (US); Baining Guo, Beijing (CN); Sean U. Kelly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1012 days.

(21) Appl. No.: 10/112,394

(22) Filed: Mar. 29, 2002

(65) Prior Publication Data

US 2003/0184576 A1   Oct. 2, 2003

(51) Int. Cl.
    *G06F 3/00* (2006.01)
(52) U.S. Cl. ......... 715/782; 715/778; 715/765; 715/766; 715/757
(58) Field of Classification Search .............. 715/156, 715/419, 427, 757, 778, 782, 765, 766; 345/419
    See application file for complete search history.

(56) References Cited

U.S. PATENT DOCUMENTS

| | | | |
|---|---|---|---|
| 5,513,276 A * | 4/1996 | Theodoracatos | 382/154 |
| 5,838,317 A | 11/1998 | Bolnick et al. | |
| 6,043,817 A | 3/2000 | Bolnick et al. | |
| 6,081,275 A * | 6/2000 | Kojima | 345/427 |
| 6,118,474 A * | 9/2000 | Nayar | 348/36 |
| 6,191,808 B1 * | 2/2001 | Katayama et al. | 348/39 |
| 6,195,104 B1 * | 2/2001 | Lyons | 345/473 |
| 6,198,484 B1 * | 3/2001 | Kameyama | 345/419 |
| 6,243,054 B1 * | 6/2001 | DeLuca | 345/7 |
| 6,377,230 B1 * | 4/2002 | Yamazaki et al. | 345/7 |
| 6,400,364 B1 * | 6/2002 | Akisada et al. | 345/427 |
| 6,411,292 B1 * | 6/2002 | Cook et al. | 345/419 |
| 6,414,681 B1 * | 7/2002 | Ohshima et al. | 345/428 |
| 6,608,615 B1 * | 8/2003 | Martins | 345/156 |
| 6,803,928 B2 * | 10/2004 | Bimber et al. | 715/757 |
| 2002/0109680 A1 * | 8/2002 | Orbanes et al. | 345/418 |
| 2002/0135738 A1 * | 9/2002 | Cok et al. | 353/7 |
| 2003/0076299 A1 * | 4/2003 | Trajkovic | 345/157 |
| 2003/0080937 A1 * | 5/2003 | Light | 345/156 |

OTHER PUBLICATIONS

Loretta Staples, Representation in Virtual Space: Visual Convention in the Graphical User Interface, INTERCHI'93, 1993, 8 pages.
Gerti Kappel, et al., State of Art and Open Issues on Graphical User Interfaces for Object-Oriented Database Systems, University of Vienna, 1992, pp. 1-20.

\* cited by examiner

*Primary Examiner* — Ba Huynh
*Assistant Examiner* — Mylinh Tran
(74) *Attorney, Agent, or Firm* — Lee & Hayes, PLLC

(57) ABSTRACT

An operating system shell has an underlying desktop object that is rendered according to different views. The operating system shell renders on a display screen a desktop graphical user interface with windows, tools, icons, etc. that are within a segment of the desktop object that can be observed (i.e., rendered) from one of the views. In illustrated implementations, the desktop object is of an extent that is greater than can be rendered from a single view. Allowing a user to select or access different views of the desktop object effectively provides an extended desktop that overcomes the fixed and limited display capabilities of conventional operating system shells.

22 Claims, 6 Drawing Sheets

PEEK AROUND USER INTERFACE

FIELD OF THE INVENTION

The present invention relates to graphical user interfaces for computer operating systems and, in particular, to a graphical user interface that may be rendered according to different views to provide an enlarged operating system desktop.

BACKGROUND AND SUMMARY OF THE INVENTION

It is now common for operating systems to have a shell that provides a graphical user interface (GUI). The shell is a piece of software (either a separate program or component part of the operating system) that provides direct communication between the user and the operating system. The graphical user interface typically provides a graphical icon-oriented and/or menu driven environment for the user to interact with the operating system.

The graphical user interface of many operating system shells is based on a desktop metaphor that creates a graphical environment simulating work at a desk. These graphical user interfaces typically employ a windowing environment with the desktop.

The windowing environment presents the user with specially delineated areas of the screen called windows, each of which is dedicated to a particular application program, file or document. Each window can act independently, as if it were a virtual display device under control of its particular application program. Windows can typically be resized, moved around the display, and stacked so as to overlay another. In some windowing environments, windows can be minimized to an icon or increased to a full-screen display.

Windows may be rendered beside each other or may have a top to bottom order in which they are displayed, with top windows at a particular location on the screen overlaying any other window at that same location according to a z-order (an order of the windows along a conceptual z-axis normal to the desktop or display screen). The top-most window has the "focus" and accepts the user's input. The user can switch other windows to the top (and thereby change the z-order) by clicking on the window with a mouse or other pointer device, or by inputting certain key combinations. This allows the user to work with multiple application programs, files and documents in a manner similar to physically working with multiple paper documents and items that can be arbitrarily stacked or arranged on an actual desk.

Typically, the physical dimensions of computer display screen are much more limited than the desires of users to have different windows, tools, icons, etc. rendered simultaneously and the ability of operating system shells to do so. The result is that the limited extent of display screen "real estate" can limit the ability of operating system shells to render multiple windows, tools, icons, etc. simultaneously.

A variety of prior implementations have attempted to compensate for the fixed and limited extent of display screens. In one prior implementation referred to as morphing, objects (e.g., windows) are quickly transformed into smaller representations or symbols to reduce the amount of display screen area they require. For example, a window may be minimized to a symbol that is rendered on a task bar along on edge of the display screen. The working size f the object may then be re-generated by selecting or activating the symbol.

In another prior implementation referred to as scrolling, some objects (e.g., windows) are accessed from an unrendered, off-screen region by scrolling the objects into the fixed display screen area. For example, the user could be provided a graphical user interface affordance (such as a scroll bar) with which the off-screen objects are to moved into view.

In yet another prior implementation referred to as pop-ups/drop-downs, a user interface affordance (e.g., a menu name) is acted on by user to produce an overlay of other elements such as a window full of menu items that are separately selectable. Typically, this overlay is easily dismissed from the display screen. Finally, in still another prior implementation referred to as drawers, a user interface affordance at the edge of a display screen or window can be pulled out to reveal an overlay of objects or menu items, in the manner of a cabinet drawer. Typically the user can control the amount of the drawer that is pulled out to reveal more or fewer of the objects.

Such prior implementations attempting to compensate for the fixed and limited extent of display screens may be characterized as allowing a user either to move objects onto the fixed display screen area (e.g., as in scrolling or pop-ups/drop-downs or drawers) or moving objects from the display screen or reducing their size (e.g., morphing). As aspect of the present invention is that the fixed and limited extent of display screens may be effectively extended or enlarged by providing different views of an underlying desktop object.

The present invention provides an operating system shell with an underlying desktop object that is rendered according to different views. The operating system shell renders on a display screen a desktop graphical user interface with windows, tools, icons, etc. that are within a segment of the desktop object that can be observed (i.e., rendered) from one of the views. In illustrated implementations, the desktop object is of an extent that is greater than can be rendered from a single view. Allowing a user to select or access different views of the desktop object effectively provides an extended desktop that overcomes the fixed and limited display capabilities of conventional operating system shells.

In one implementation, a variable viewing angle interface is rendered in accordance with first and second viewing angles, the first viewing angle being perpendicular to the desktop object and the second viewing angle being non-perpendicular to the desktop object. A user-controlled viewing selection corresponding to one of perpendicular and angled views is obtained and encompasses one of respective first and second regions of the desktop object. The operating system graphical user interface is rendered as a three-dimensional image transformation of the desktop object in accordance with the selected view.

The present invention allows use of a desktop object that is larger than or extended relative a conventional display screen. Changes between the different views, such as making the change from the perpendicular view to the angled view, is akin to taking a "peek" around an obstruction, in this case the edge of a display screen. Accordingly, this use of different image transformation representations to provide different views of a desktop object may sometimes be referred to as a "peek-around" user interface that quickly reveals portions of desktop object that would normally not be seen.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
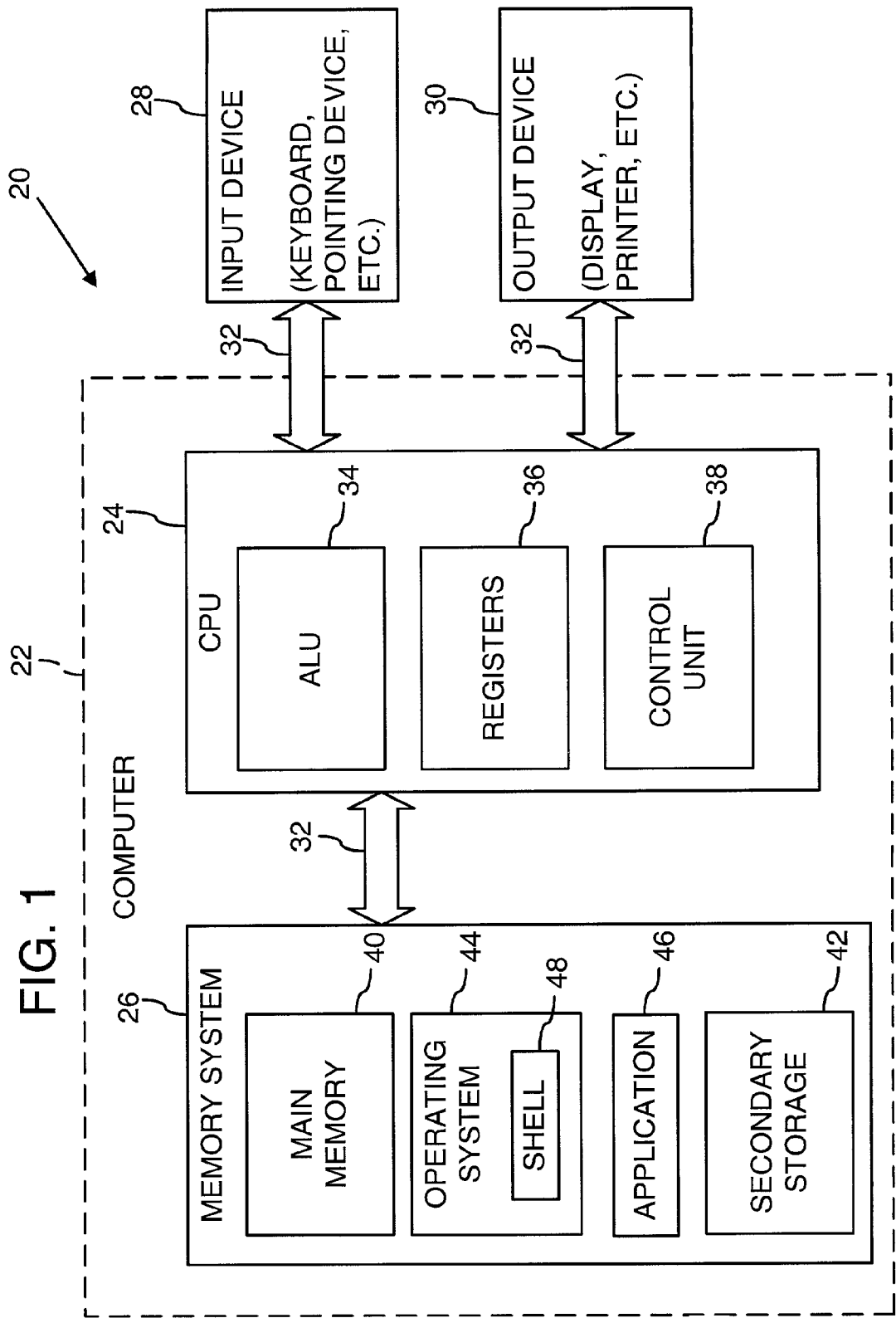
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system 44 and typically at least one application program 46. Operating system 44 is the set of software that controls the computer system operation and the allocation of resources. Application program 46 is the set of software that performs a task desired by the user, using computer resources made available through operating system 44. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Operating system 44 has a shell 48 that provides a graphical user interface (GUI). The shell 48 is a piece of software (either a separate program or component part of the operating system) that provides direct communication between the user and operating system 44. The graphical user interface typically provides a graphical icon-oriented and/or menu driven environment for the user to interact with the operating system. The graphical user interface of many operating system shells is based on or referred to as a desktop metaphor in which a graphical environment simulates working at a desk. These graphical user interfaces typically employ a windowing environment within the desktop metaphor.

Figure 2:
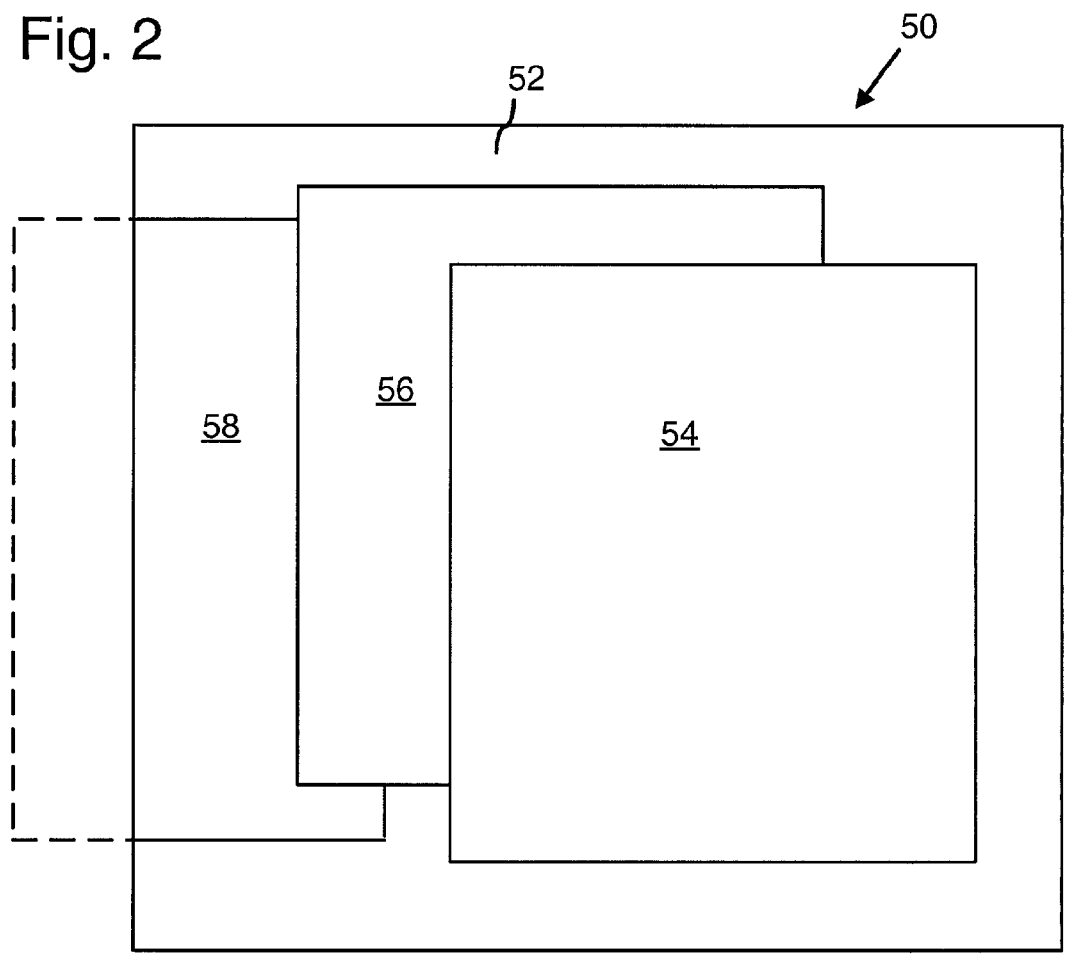
FIG. 2 is a diagram illustrating a desktop-based graphical user interface with a perpendicular view of an underlying desktop according to the present invention.

FIG. 2 is a diagram illustrating a desktop-based graphical user interface 50 with a perpendicular view of an underlying desktop 52 over which are rendered windows 54 and 56 and a portion of a window 58. (An unrendered portion of window 58 is indicated by dashed lines.) It will be appreciated that any number of windows could be rendered on desktop 52. Windows 54-58 are rendered by shell 48 and allow a user to interact with operating system 44 or an application 46 running on operating system 44.

Desktop-based graphical user interface 50 provides a plan view of desktop 52 and windows 54-58. In the plan view, the desktop 52 and windows 54-58 are represented as being in one or more planes that are perpendicular to a predefined line of vision from a user.

Figure 3:
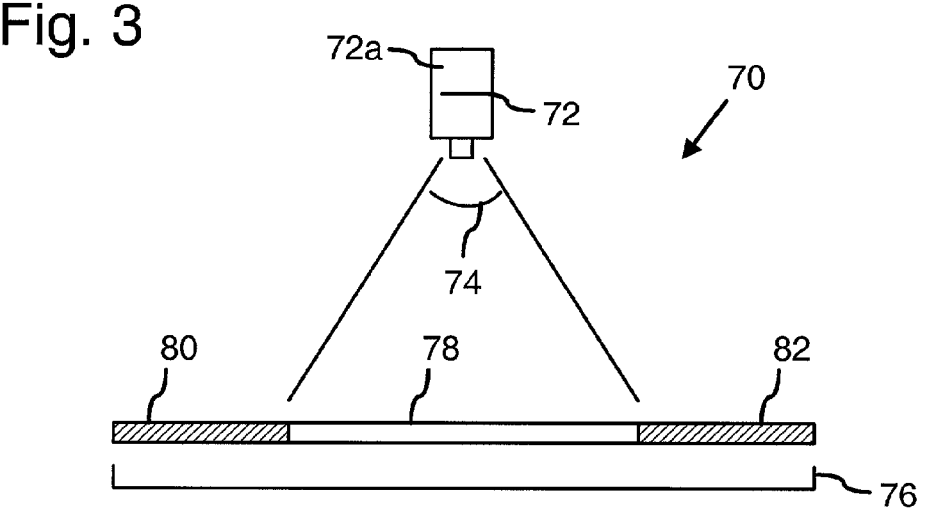
FIG. 3 is a top plan view of an image transformation representation corresponding to the perpendicular view of the desktop of FIG. 2.

FIG. 3 is a top plan view of an image transformation representation 70 corresponding to the perpendicular view of desktop 52 in graphical user interface 50. Image transformation representation 70 includes a viewpoint 72 (indicated schematically as an image plane 72a a camera 72 ) with a viewing range 74 and a perpendicular orientation to an extended desktop object 76. The perpendicular orientation of viewpoint 72 encompasses a central segment 78 of extended desktop object 76 and omits lateral segments 80 and 82 of extended desktop object 76.

Image transformation representation 70 illustrates that the appearance of desktop 52 rendered on a computer display screen is based upon a three-dimensional image transformation in accordance with the present invention. Accordingly, desktop 52 corresponds to a view of desktop object 76 at viewpoint 72 having a perpendicular orientation. Such an image transformation may be generated by a conventional transformation matrix representing a three-dimensional rotation about a Y-axis and being of the form:

$$M = \begin{bmatrix} \cos A & 0 & -\sin A & 0 \\ 0 & 1 & 0 & 0 \\ \sin A & 0 & \cos A & 0 \\ 0 & 0 & 0 & 1 \end{bmatrix},$$

where A is the angle of rotation. The matrix M is multiplied by a matrix corresponding to an object being rendered (e.g., a window and any features to be rendered within it) to generate the resulting view, as is known in the art of three-dimensional rendering. While it is sometimes used in applications that provide three-dimensional spatial representations, this type of three-dimensional projection transformation calculation is not the typical basis used by a shell 48 to generate a desktop graphical user interface.

The perpendicular view of desktop 52 may have an appearance similar to that of a conventional desktop graphical user interface. It will be appreciated, however, that perpendicular view of desktop 52 is generated in a manner different from that of a conventional desktop graphical user interface. The three-dimensional projection transformation calculation above is used to generate both the perpendicular and angled views of desktop-based graphical user interface 50. In contrast, a conventional desktop style graphical user interface is typically generated as a simple two-dimensional representation that is incapable of accommodating the different viewing angles provided by the present invention.

Figure 4:
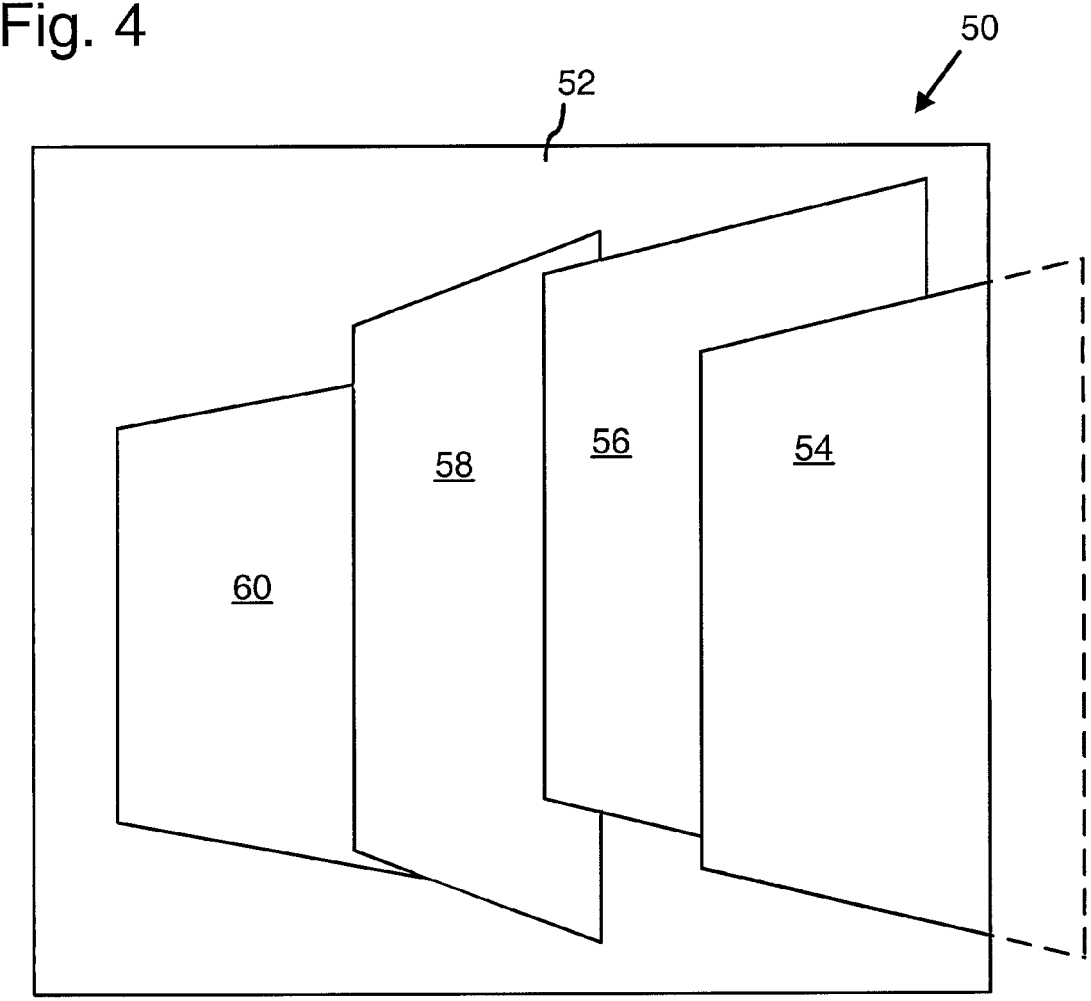
FIG. 4 is a diagram illustrating graphical user interface with an angled-view of an underlying desktop according to the present invention.

FIG. 4 is a diagram illustrating graphical user interface 50 with an angled-view of underlying desktop 52 over which are rendered windows 54, 56, 58, and 60. The angled-views of windows 54-60 are rendered by the shell 48 of operating system 44 and provided an extended view of desktop 52 that allows the user to interact with operating system 44 or an application running 46 on operating system 44.

In the angled view of FIG. 4, the desktop 52 and windows 54-60 are represented as being in one or more planes that are not perpendicular to a predefined line of vision from a user. In the illustrated implementation, the angled-view is angled laterally relative to the perpendicular view. In the angled view, the desktop 52 and windows 54-60 are represented as having a non-perpendicular orientation to a central predefined line of vision from viewpoint 72 to the display screen. As a result, windows 45-60 are rendered with a parallax that causes the otherwise rectangular windows 54-60 to have trapezoidal shapes. It will be appreciated that the parallax of windows 54-60 in FIG. 4 would also affect any graphics, images, text, etc. rendered within windows 54-60.

Figure 5:
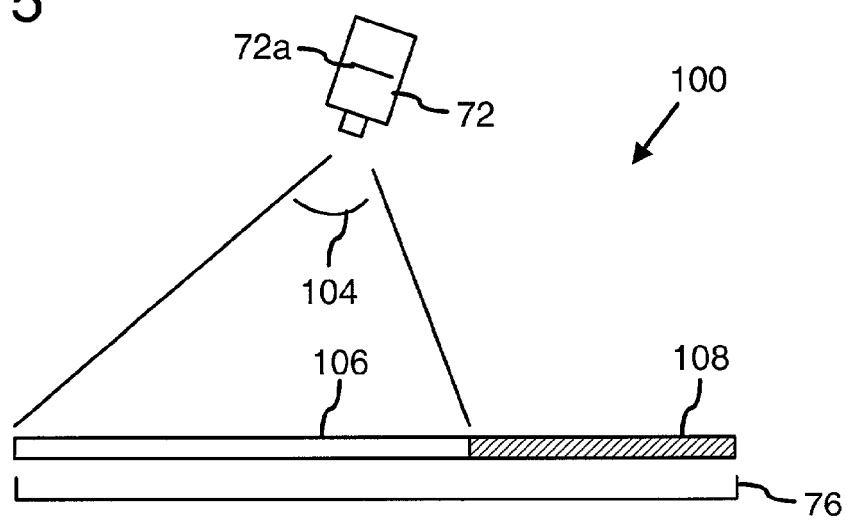
FIG. 5 is a top plan view of an image transformation representation corresponding to the angled view of the desktop of FIG. 4.

FIG. 5 is a top plan view of an image transformation representation 100 corresponding to the angled view of desktop 52 in graphical user interface 50. Image transformation representation 100 includes a viewpoint 102 with a viewing range 104 and a laterally non-perpendicular orientation to desktop object 76. Viewing range 104 established by the non-perpendicular orientation of viewpoint 72 encompasses a major side desktop segment 106. A second minor side desktop segment 108 is not included in viewing range 104.

Image transformation representations 70 and 100 allow desktop object 76 to be larger than or extended relative a conventional desktop object. The pivoting or rotation distinguishing viewpoints 72 and 102 makes the change from the perpendicular view to the angled view akin to taking a "peek" around an obstruction, in this case the edge of a display screen. Accordingly, this use of different image transformation representations to provide different views of a desktop object may sometimes be referred to as a "peek-around" user interface that quickly reveals portions of desktop object that would normally not be seen.

As with conventional desktop-style graphical user interfaces, graphical user interface 50 of the present invention allows a user to manipulate and move windows rendered on desktop 52. For example, users may move windows between central segment 78 corresponding to the perpendicular view of FIGS. 2 and 3 and segments 80 and 82 that can be encompassed within angled views.

An optional aspect of graphical user interface 50 is that users could move windows between central segment 78 and segments 80 and 82 with keystroke or cursor controller (e.g., mouse) actions. For example, a window that is in one of segments 80 and 82 and rendered in an angled view of desktop object 76 could be moved to central segment 78 by a user selecting or activating the window. Likewise, a window that is in central segment 78 and rendered in the perpendicular view of desktop object 76 could be moved to one of segments 80 and 82 by a predefined keyboard action by the user or by the user dragging a predefined portion of the window beyond a margin of the display screen.

Extended desktop object 76 in FIGS. 3 and 5 is represented as a planar image surface that is generally parallel to the display screen on which desktop 52 is rendered. Other aspects of the present invention are that extended desktop objects of other configurations may be used and that image transformation representations other than viewpoint rotation may be used to access and render marginal segments of an extended desktop object.

Figure 6:
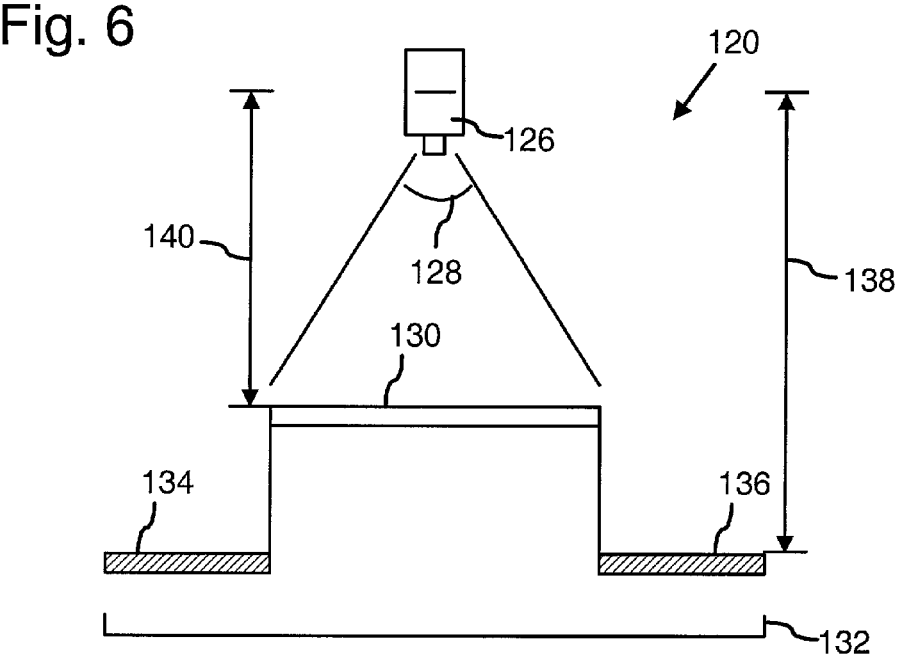
FIG. 6 is an image transformation representation illustrating a perpendicular view of a desktop with a non-planar, stepped desktop object.

FIG. 6 is an image transformation representation 120 illustrating a perpendicular view of a desktop (not shown) in a graphical user interface (not shown). Image transformation representation 120 includes a viewpoint 126 with a viewing range 128 extending over a planar central segment 130 of a non-planar, stepped desktop object 132. Non-planar desktop object 132 further includes lateral segments 134 and 136 that are generally parallel to central segment 130, but correspond to a depth or distance 138 from viewpoint 126 greater than depth or distance 140 to central segment 130.

Depth or distance 138 of lateral segments 134 and 136 causes windows (not shown) that are position within segments 134 and 136 to appear farther from viewpoint 126 and, as a result, are rendered with a correspondingly smaller size that allows more objects (e.g., windows) to be rendered or discerned. It will be appreciated that the generation or rendering of windows or other objects in lateral segments 134 and 136, in comparison to the rendering in central segment 130, is readily accommodated by a depth factor in the conventional transformation matrix calculation for the display.

Figure 7:
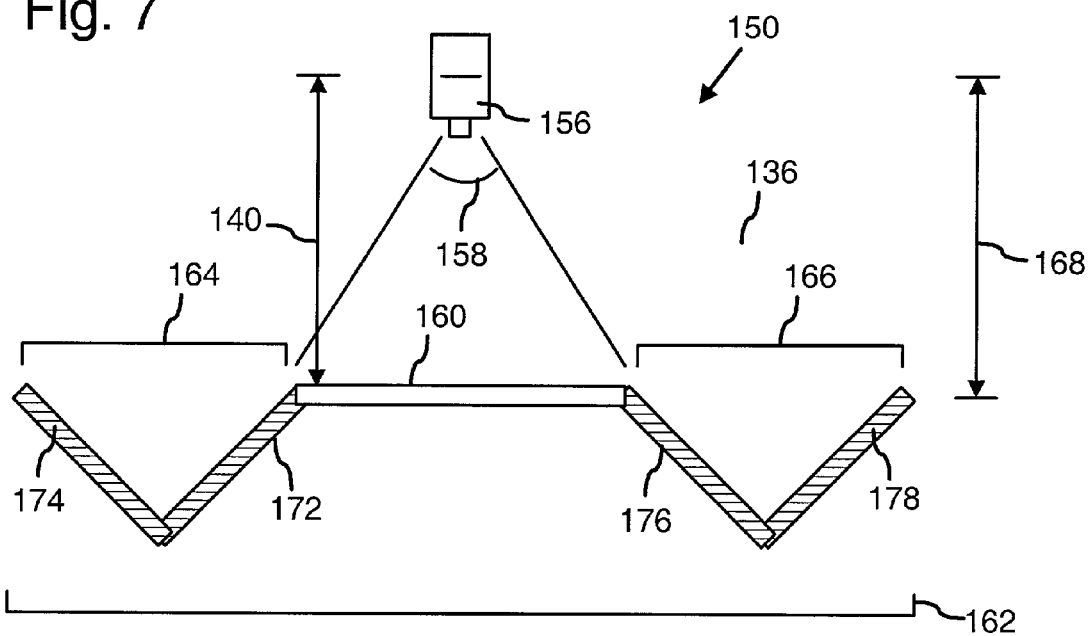
FIG. 7 is an image transformation representation illustrating a perpendicular view of a desktop with a non-planar desktop object having inclined segments.

FIG. 7 is an image transformation representation 150 illustrating a perpendicular view of a desktop (not shown) in a graphical user interface (not shown). Image transformation representation 150 includes a viewpoint 156 with a viewing range 158 extending over a planar central segment 160 of a non-planar desktop object 162. Non-planar desktop object 162 further includes lateral segments 164 and 166 that are inclined (i.e., generally not parallel) relative to central segment 160, and correspond to a depth or distance 168 from viewpoint 156 typically greater than depth or distance 170 to central segment 160.

Lateral segment 164 includes a pair of oppositely inclined regions 172 and 174, with inner region 172 being positioned between central segment 160 and outer region 174. Likewise, lateral segment 166 includes a pair of oppositely inclined regions 176 and 178, with inner region 176 being positioned between central segment 160 and outer region 178. In the illustrated implementation, inner inclined regions 172 and 176 are of generally the same size and inclination as outer regions 174 and 178, respectively. It will be appreciated, however, that inner regions 172 and 176 could be of size or inclination that differ from those of regions 174 and 174. For example, inner regions 172 and 176 could be shorter and steeper than regions 174 and 174. It will be appreciated that the generation or rendering of windows or other objects in lateral segments 164 and 166, in comparison to the rendering in central segment 130, is readily accommodated by a depth factor in the conventional transformation matrix calculation for the display.

The inclinations of inner regions 172 and 176 will result in any windows rendered in those regions to have a greater parallax than windows rendered with reference to windows rendered in lateral segments of non-inclined desktop object (e.g., FIGS. 4 and 5). Conversely, the inclinations of outer regions 174 and 178 will result in any windows rendered in those regions being rendered with little or no parallax. It will be appreciated, therefore, that relatively steep, narrow inner regions 172 and 176 could provide visual transitions to wider, extended outer regions 174 and 178 to give a user an extended, parallax-free desktop.

The non-planar desktop object 162 of graphical user interface 154 is merely one example illustrating that graphical user interfaces of the present invention could employ a variety of non-planar desktop objects. Alternative desktop objects could employ other combinations of flat segments, as illustrated, or could employ segments with smooth or continuous configurations. It will be appreciated that the generation or rendering of windows or other objects on such desktop objects, in comparison to the rendering in central segment 130, is readily accommodated by a depth factor in the conventional transformation matrix calculation for the display.

Figure 8A:
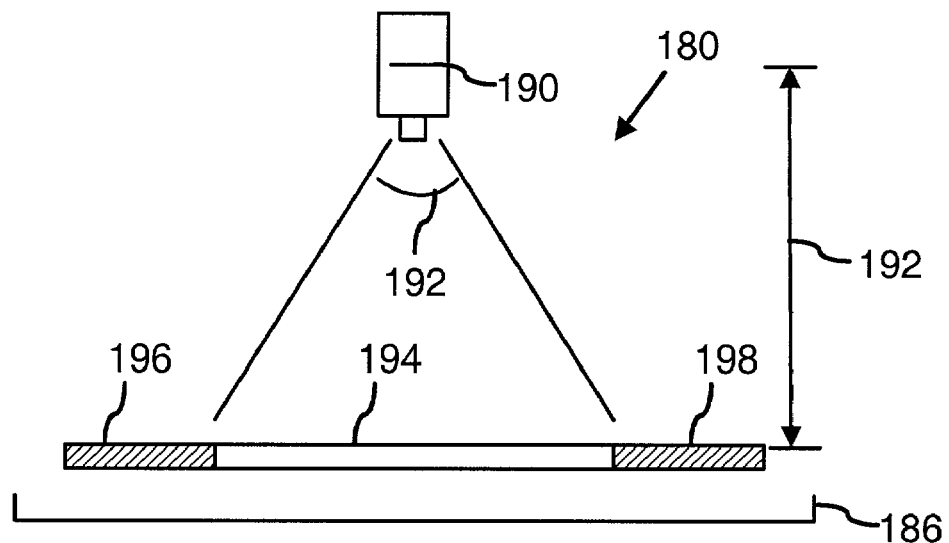
FIGS. 8A and 8B are image transformation representations illustrating perpendiculars a planar desktop object at different first and second image distances.

FIG. 8A is an image transformation representation 180 illustrating a first perpendicular view of a desktop (not shown) on a desktop object 186 in a graphical user interface (not shown). Image transformation representation 180 includes a viewpoint 190 that is a first distance 192 from desktop object 186 and includes a viewing range 192 extending over a central segment 194. Lateral segments 196 and 198 of desktop object 186 are not included within viewing range 192.

Figure 8B:
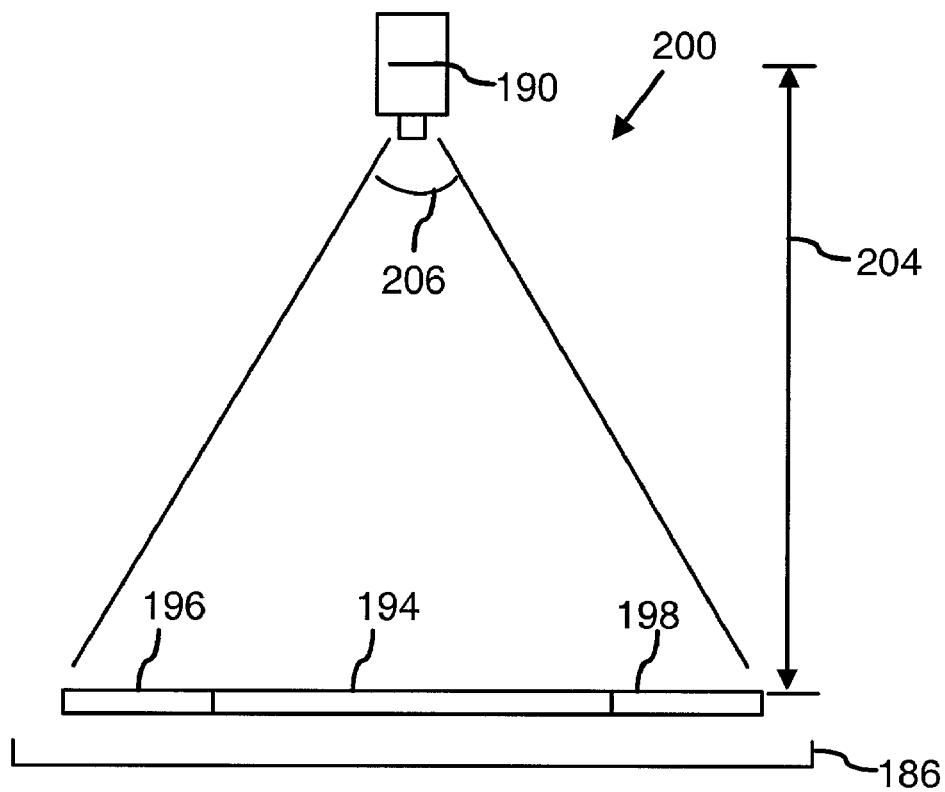

FIG. 8B is an image transformation representation 200 illustrating a second perpendicular view of desktop (not shown) on desktop object 186 in graphical user interface (not shown). Image transformation representation 200 includes viewpoint 190 that is a second distance 204 from desktop object 186 and includes a viewing range 206 extending over all of desktop object 186. Second distance 204 between viewpoint 190 and desktop object 194 is greater than first distance 192 so that viewing range 206 encompasses desktop object 186 while viewing range 192 encompasses only central segment 194.

Image transformation representations 180 and 200 illustrate that the use of three-dimensional image transformations for rendering operating system displays may extend beyond lateral rotations. It will be appreciated that the generation or rendering of windows or other objects in image transformation representations 180 and 200 is readily accommodated by a depth factor in the conventional transformation matrix calculation for the display.

Figure 9:
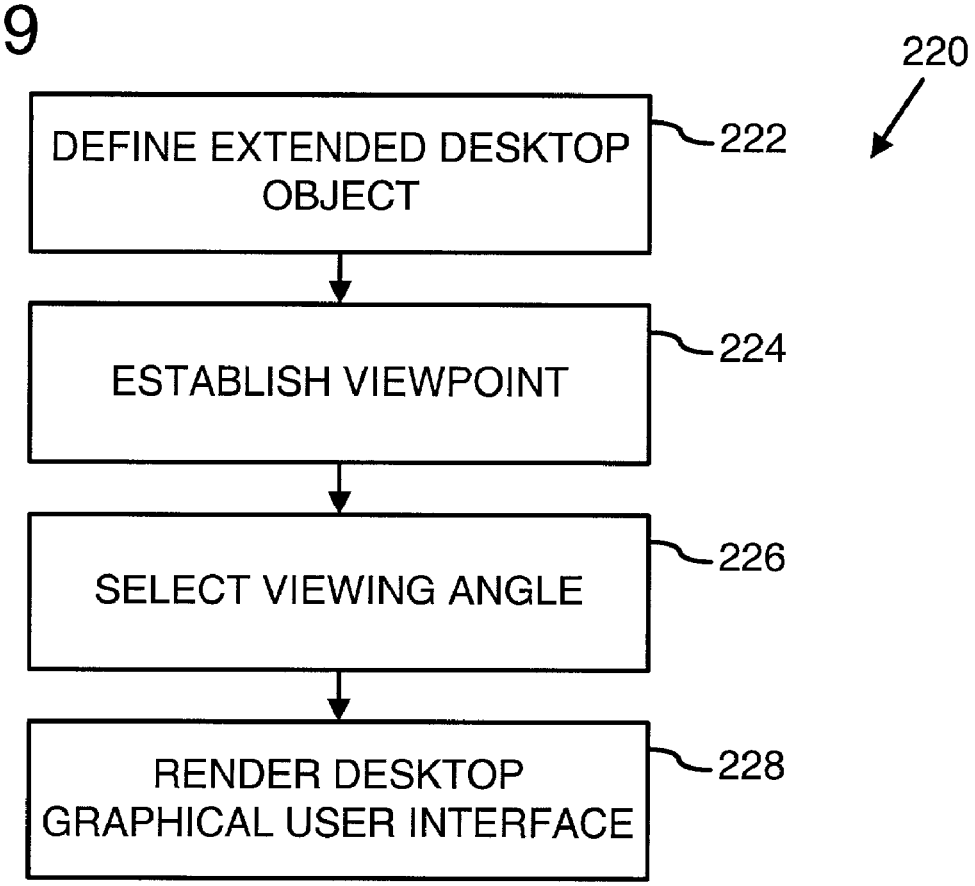
FIG. 9 is a flow diagram of a desktop shell rendering method for selectively generating different views of a desktop-based graphical user interface.

FIG. 9 is a flow diagram of a desktop shell rendering method 220 for selectively generating perpendicular and angled views of desktop-based graphical user interface 50. It will be appreciated that method 220 is similarly applicable to generating alternative desktop views described with reference to FIGS. 6-8, and other alternative desktop views as well.

Process block 222 indicates that an extended desktop object (e.g., extended desktop object 76) is defined to have at least one dimension greater than a corresponding display screen. For example, the extended desktop object may have only a lateral dimension that is greater than a corresponding display screen dimension, as with exemplary extended desktop object 76. Alternatively, the extended desktop object may have only a vertical dimension that is greater than a corresponding display screen dimension, or may have both a lateral and a vertical dimension that are greater than the corresponding display screen dimensions.

Process block 224 indicates that a viewpoint (e.g., viewpoint 72) is established for determining a view of the desktop object.

Process block 226 indicates that a viewing angle is selected between the viewpoint and the extended desktop object. As an example, a default perpendicular viewing angle may be defined. An angled, non-perpendicular viewing angle may be selected either upon a specific user command or automatically upon a user positioning a cursor at or within a predefined distance of a side margin of the display screen. Alternatively, eye pupil motion detection may be employed to detect a user looking to a side margin of a display.

Process block 228 indicates that a desktop graphical user interface is rendered in accordance with the selected viewing angle.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. In a computer storage medium, an operating system shell, stored in a memory and executable on a processor, that provides on a display screen with a surface, a graphical user interface for interaction between a user and an operating system, comprising:

a variable viewing angle interface, stored in the memory and executable on the processor, rendered in accordance with at least first and second viewing angles, the first viewing angle being perpendicular to a desktop object that is rendered parallel to the surface of the display screen, the desktop object contains at least one of a plurality of non-planar window objects, the at least one window object is rendered rectangularly, and the second viewing angle being non-perpendicular to the desktop object, the variable viewing angle interface employing a three-dimensional image transformation to render the desktop object and the at least one rectangularly rendered window object three-dimensionally, the variable viewing angle interface employing parallax to render more content within the desktop object, wherein employing parallax comprises causing the at least one rectangularly rendered window objects to be rendered trapezoidally in the second viewing angle, transition from the first and second viewing angles effectuated by eye pupil motion detection of at least one of the user's eyes, the first and second viewing angles being defined by a physical orientation of a line of sight directed from the at least one of the user's eyes in relation to the display screen.

2. The system of claim 1, the second viewing angle pivoted about a vertical axis relative to the first viewing angle to provide a different lateral view with respect to the desktop object.

3. The system of claim 1, the second viewing angle pivoted only about a vertical axis relative to the first viewing angle to provide a different lateral view with respect to the desktop object.

4. The system of claim 1, further comprising a user-controlled viewing angle selector operable by a user to select between the first and second viewing angles.

5. The system of claim 4, the user-controlled viewing angle selector provides selections between the first and second viewing angles according to user positioning of an operating system-controlled cursor within a predefined distance from a margin of the display screen.

6. The system of claim 4, the user-controlled viewing angle selector provides selections between the first and second viewing angles according to user positioning of an operating system cursor within a predefined distance from a side margin of the display screen.

7. The system of claim 1, wherein employing parallax further comprises:
  causing images, graphics, and/or text displayed on the at least one of a plurality of windows rendered trapezoidally in the second viewing angle to be rendered trapezoidally in proportion to the window.

8. One or more computer storage media storing instructions to implement an operating system shell that provides on a display screen a graphical user interface for interaction between a user and an operating system, the instructions when executed configure a processor to perform acts comprising:
  rendering an angled view graphical user interface on the display screen in accordance with a viewing angle that is not perpendicular to the display screen in at least one angular dimension, the angled view graphical user interface utilizes the viewing angle to portray surplusage of a desktop object, the desktop object containing at least one window object, the desktop object comprises a central segment and a peripheral segment, the surplusage rendered on the peripheral segment by employing parallax to render more content, wherein employing parallax comprises transforming a rendering of a rectangularly shaped window object into a rendering of a trapezoidally shaped window object;
  employing a three-dimensional image transformation to render the desktop object and the at least one window object three-dimensionally in the angled view graphical user interface; and
  determining, by eye pupil motion detection of at least one of the user's eyes, the viewing angle being defined by a physical orientation of a line of vision from the at least one of the user's eyes relative to the display screen.

9. The one or more computer storage media of claim 8, the at least one angular dimension includes a viewing angle that is pivoted about a viewing axis that is generally parallel to the desktop object and has a generally vertical orientation.

10. The one or more computer storage media of claim 8, the at least one angular dimension includes a viewing angle that is pivoted only about a viewing axis that is generally parallel to the desktop object and has a generally vertical orientation.

11. The one or more computer storage media of claim 8, further comprising a user-controlled viewing angle selector operable by a user to select between the angled view graphical user interface and a generally perpendicular view graphical user interface.

12. The one or more computer storage media of claim 11, the user-controlled viewing angle selector provides selections between the angled view graphical user interface and the generally perpendicular view graphical user interface according to user positioning of an operating system-controlled cursor within a predefined distance from a margin of the display screen.

13. The system of claim 8, wherein the desktop object comprises at least one of a plurality of non-planar windows.

14. The system of claim 13, wherein the at least one of a plurality of non-planar windows are rendered rectangularly.

15. The system of claim 14, wherein employing parallax comprises:
  causing the at least one of a plurality of non-planar windows rendered rectangularly in the first viewing angle to be rendered trapezoidally in the second viewing angle.

16. One or more computer storage storage media storing operating system shell graphical user interface rendering instructions that, when executed on a processor, perform acts for providing on a display screen a graphical user interface for interaction between a user and an operating system, the acts comprising:
  obtaining a user-controlled viewing angle selection corresponding to one of at least first and second views that encompass respective first and second regions of a desktop object, the desktop object contains at least one rectangularly shaped window object, the first and second regions of the desktop object obliquely aligned with one another, the second region of the desktop employing parallax to render more content, wherein employing parallax comprises transforming a rendering of the at least one rectangularly shaped window object into a rendering of a trapezoidally shaped window object;
  detecting eye pupil movement of at least one of the user's eyes to select between the respective first and second regions, the user-controlled viewing angle selection being defined by a physical orientation of a line of sight directed from the at least one of the user's eyes in relation to the display screen; and
  rendering an operating system graphical user interface as a three-dimensional image transformation of the desktop object to elicit further content of the desktop object in accordance with the one of at the at least first and second views corresponding to the user-controlled viewing angle selection.

17. The medium of claim 16, the first and second views correspond to first and second viewing angles, the first viewing angle being perpendicular to the desktop object and the second viewing angle being non-perpendicular to the desktop object.

18. The medium of claim 17, the acts further comprising rendering the operating system graphical user interface in accordance with the second viewing angle and defining the second viewing angle as being pivoted from the first viewing angle about a vertical axis to provide a different lateral view with respect to the desktop object.

19. The medium of claim 17, the acts further comprising rendering the operating system graphical user interface in accordance with the second viewing angle and defining the second viewing angle as being pivoted from the first viewing angle only about a vertical axis to provide a different lateral view with respect to the desktop object.

20. The medium of claim 16, the acts further comprising obtaining the user-controlled viewing angle selection and determining user positioning of an operating system-controlled cursor relative to a predefined distance from a margin of the display screen.

21. The medium of claim 16, the first and second views correspond to respective first and second viewing distances of a viewpoint from the desktop object.

22. An operating system shell graphical user interface rendering method for providing on a display screen a graphical user interface through which a user interacts with an operating system, the method comprising:

obtaining a user-controlled viewing selection corresponding to first and second views that encompass respective first and second regions of a desktop object, the desktop object contains at least one rectangularly shaped window object, the first region of the desktop object aligned obtusely to the second region of the desktop object, the first and second views correspond to at least one of viewpoint and viewing distances of respective first and second viewing angles relative to the desktop object, wherein the viewpoint relative to the desktop object corresponds to a viewpoint of the user, the viewpoint and viewing distances of the respective first and second viewing angles being defined by physical orientation of a line of vision from the at least one of the user's eyes relative to the display screen;

parallacticly rendering an operating system graphical user interface as a three-dimensional image transformation of the desktop object using a graphical processing unit to present content within the respective first and second regions of the desktop object in accordance with the one of at the at least first and second views corresponding to the user-controlled view selection, wherein parallacticly rendering comprises transforming a rendering of the at least one rectangularly shaped window object into a rendering of a trapezoidally shaped window object, wherein the user-controlled view selection utilizes an eye pupil movement detector for detection of eye pupil movement of at least one of the user's eyes to transition from the first and second views or user positioning of an operating system-controlled cursor relative to a predefined distance from a margin of the display screen, and wherein the rendering the operating system graphical user interface in accordance with the second viewing angle includes defining the second viewing angle as being pivoted from the first viewing angle only about a vertical axis to provide a different lateral view with respect to the display screen.

* * * * *